May 16, 1933.  C. J. PETTIBONE  1,909,314
SAWING RIG
Filed Oct. 31, 1932   3 Sheets-Sheet 1
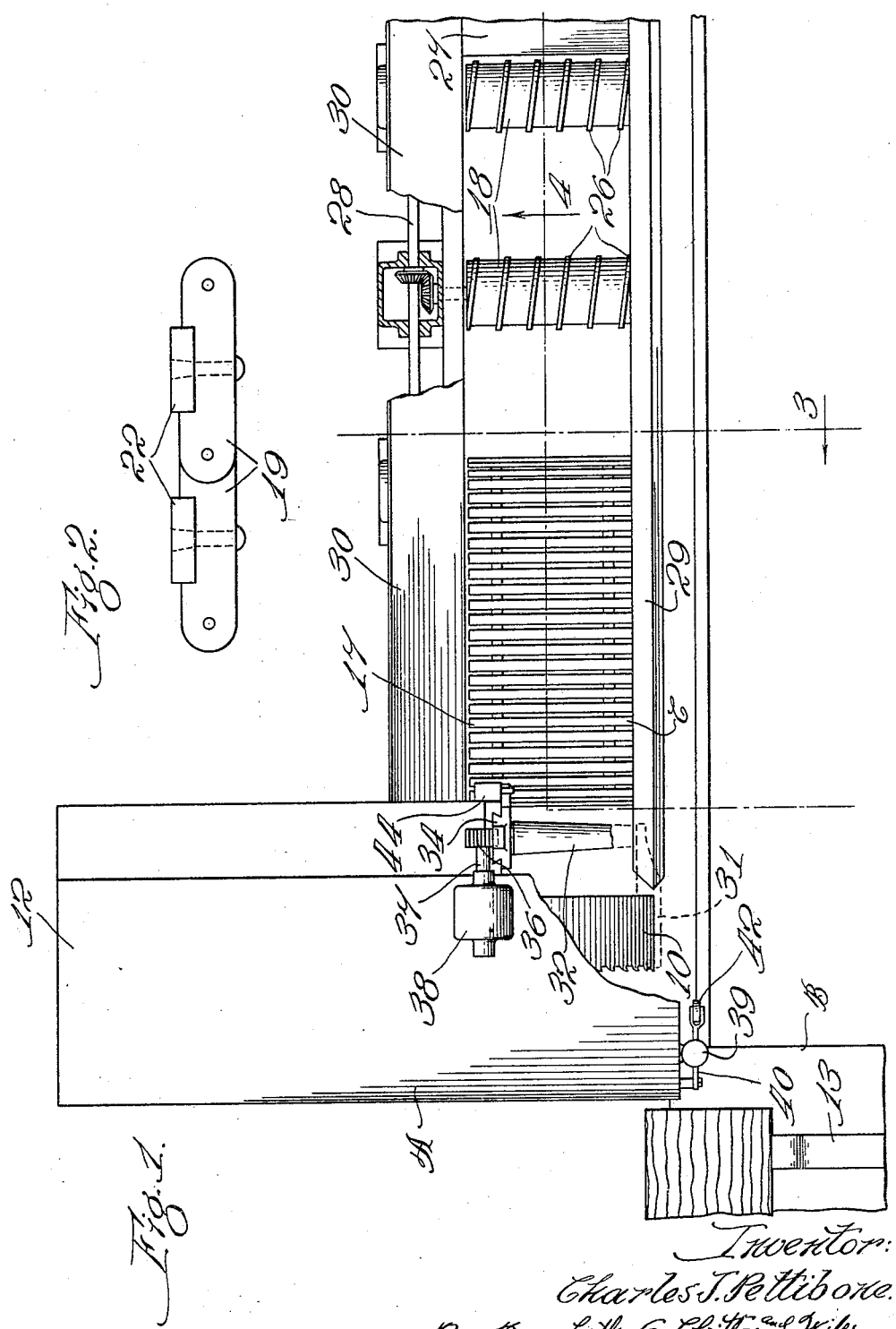
Inventor:
Charles J. Pettibone.
By Dynforth, Lee, Chritton and Wiles
Attys.

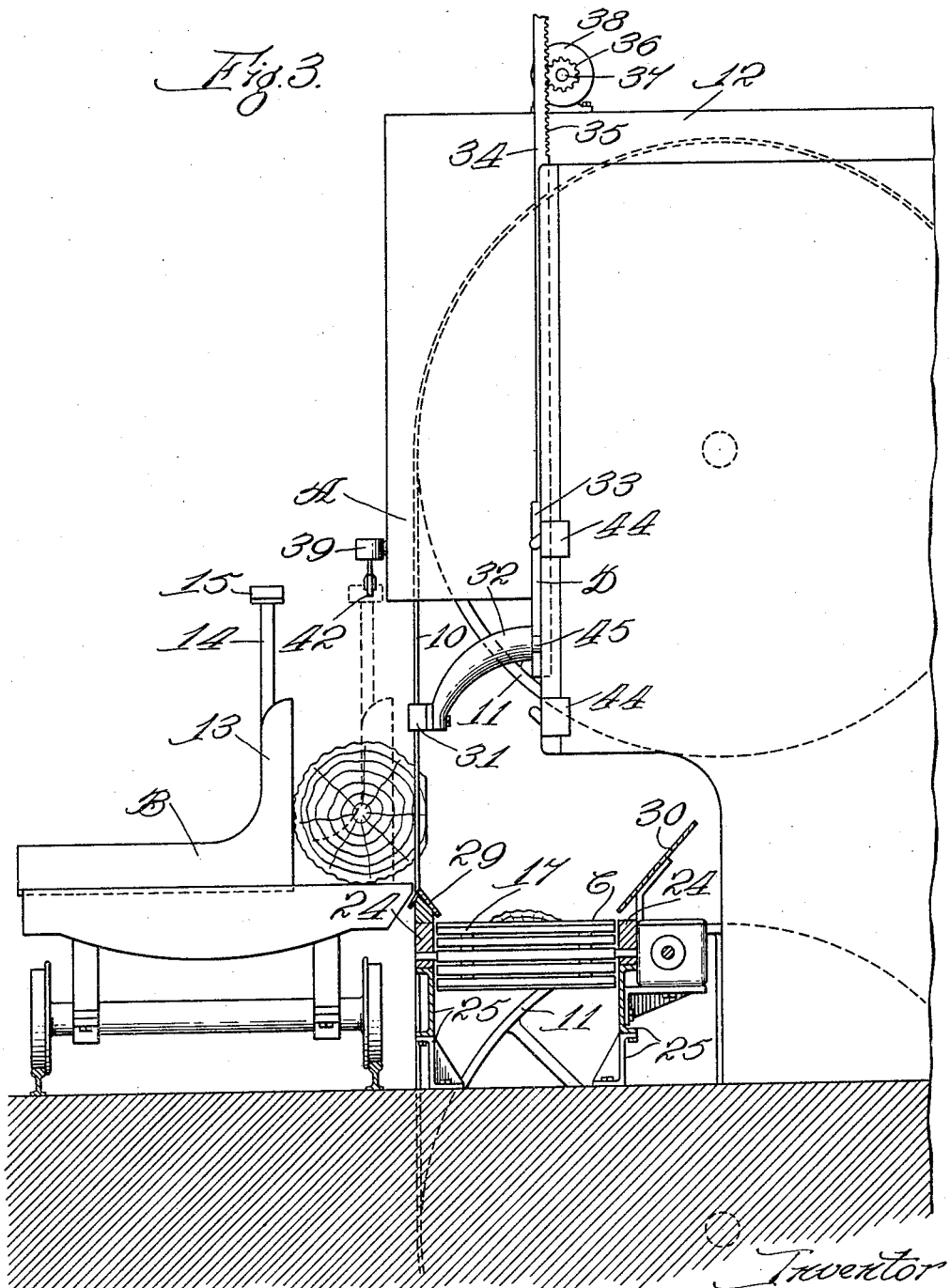

May 16, 1933.　　　C. J. PETTIBONE　　　1,909,314
SAWING RIG
Filed Oct. 31, 1932　　　3 Sheets-Sheet 3
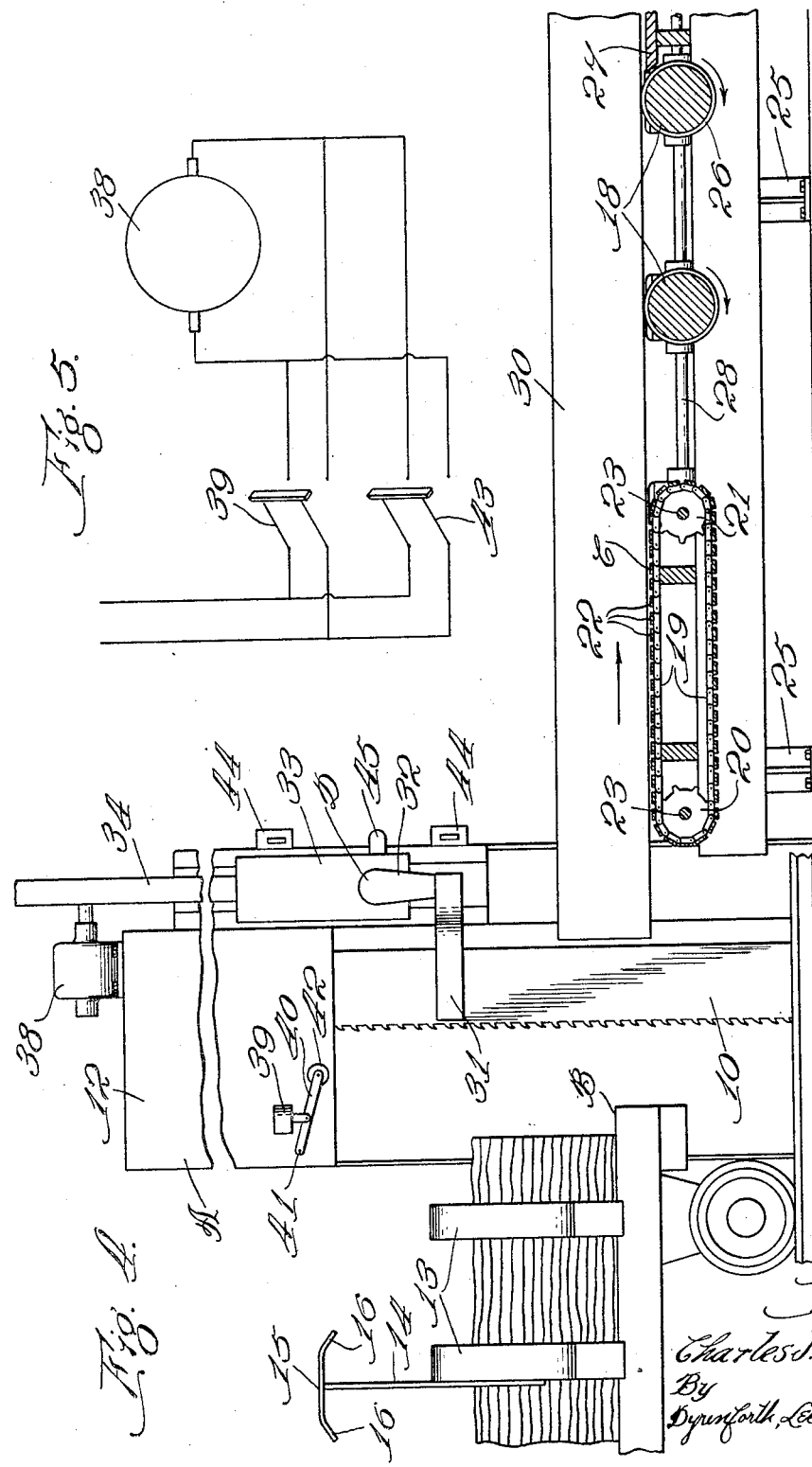

Patented May 16, 1933

1,909,314

UNITED STATES PATENT OFFICE

CHARLES J. PETTIBONE, OF HINES, OREGON, ASSIGNOR TO EDWARD HINES WESTERN PINE CO., OF HINES, OREGON, A CORPORATION OF DELAWARE

SAWING RIG

Application filed October 31, 1932. Serial No. 640,553.

This invention relates to a sawing rig and more particularly to a saw-guide and conveyor apparatus associated therewith.

An object of the invention is to provide automatic and controlled means for manipulating the saw-guide. Other specific objects and advantages will appear as the specification proceeds.

The invention is illustrated, in its preferred embodiment, by the accompanying drawings, in which—

Figure 1 is a broken plan view of apparatus embodying my invention; Fig. 2, a side detail view of part of the slat conveyor apparatus employed; Fig. 3, a vertical part-sectional view, the section being taken as indicated at line 3 of Fig. 1; Fig. 4, a longitudinal part-sectional view, the section being taken as indicated at line 4 of Fig. 1; and Fig. 5, a diagrammatic view of the wiring layout used in connection with the saw-guide.

In the illustration given, A represents sawing apparatus; B, the carriage or log-feeding mechanism; C, conveyor apparatus; and D, adjustable saw-guide mechanism.

The saw apparatus A may be of any suitable construction. In the illustration given, a band saw 10 is mounted upon wheels 11, the wheels being journaled within a suitable frame or casing 12. These parts are all of well known construction.

The carriage or timber-feeding mechanism B may also be of any suitable construction. In the illustration given, a carriage of well known construction is illustrated and a detailed description is believed to be unnecessary. Upon one of the feeding knees 13 is mounted a T-shaped standard 14, having its head 15 provided with downwardly turned or inclined ends 16. The purpose of the member 14 is to automatically actuate mechanism for raising the saw-guide and it will be described later in connection with the mechanism D.

My improved conveyor mechanism C will now be described. As shown more clearly in Figs. 2 and 4, the conveyor apparatus consists of a continuous slat-bed conveyor 17 and screw rollers 18. The conveyor 17 consists of link chains 19 mounted on sprocket wheels 20 and 21 and of slats 22 which are secured to the links 19. The sprocket wheels 20 are mounted upon shafts 23 which are journaled in longitudinal beams 24. The beams 24 are supported upon the metal beams 25 or upon any other suitable supports. Similarly supported upon the beams 24 are a plurality of screw rollers 18. Each of the rollers is provided with spiral threads 26. As shown more clearly in Figs. 1 and 4, a space is provided between the first two rollers 18 and the conveyor 17. Beyond the second roller, a platform 27 extends between each of the succeeding screw rollers (not shown). With this construction, the small particles carried upon the conveyor 17 will drop between the conveyor and the first roller and between the first two rollers; and, if desired, a conveyor (not shown) may be provided therebelow for carrying away such wood fragments.

Any suitable means for driving the conveyor 17 and the screw rollers 18 may be employed. In the illustration given, the rollers 18 and the sprocket wheel 21 are driven by bevel gear connections with a drive shaft 28, as illustrated more clearly in Fig. 1. Preferably the gear ratios are such as to drive the slat conveyor 17 at a relatively slower speed, say about 300 lineal feet per minute, and the screw rolls at a relatively faster speed, say about 400 lineal feet per minute.

In order to take the boards as they are severed from the log and to guide them into the proper position upon the conveyor C, I provide a shear or inclined guide 29 which is supported upon the beam 24 substantially between the saw 10 and the conveyor C, as shown more clearly in Fig. 3. On the opposite side of the conveyor, I provide an inclined shield 30 which is supported above the beam 24.

The saw-guide mechanism D will now be described. The saw arm 31 which is provided with a groove receiving the band saw 10 may be of any suitable construction. It is connected by means of the curved member 32 to a sliding block 33. The block 33 is secured to a reciprocating member 34 which is slidably secured to the casing 12 by a dovetail joint, as shown more clearly in Fig. 1. At its upper end, the member 34 is provided with a rack 35 which engages a gear 36 on the motor shaft 37. The shaft 37 is driven by a motor 38 mounted upon the casing 12.

Secured to a front wall of casing 12 is an automatic switch 39. The switch is actuated by a lever 40 pivotally connected to the casing at the point 41 and provided at its free end with a roller 42. The roller 42 is adapted to be engaged by the standard member 14 carried by the carriage B. The wiring connections are such that when the switch 39 is closed, the motor will raise the member 34 and the saw-guide 31. In order to lower the saw-guide, a manually-operated switch 43 may be located at any convenient place, as for example on the log-turning lever (not shown). As shown more clearly in Fig. 5, the automatic switch 39 will close the circuit so as to turn the motor in one direction (for raising the saw-guide) while the manually-operated switch 43 will close the circuit for reversing the motor (to lower the saw-guide). If desired, limit switches 44, of well known construction, may be employed to break the circuit when the saw-guide reaches a predetermined upper or lower position, the limit switches being engaged by a finger 45 carried by the block 33.

*Operation*

In the operation of the apparatus, the band saw is driven by the wheels 11 in a well known manner and the carriage B is moved back and forth to feed the log or other form of timber to the saw. As the boards fall from the saw, they are guided by the shear 29 into a natural flat position upon the slat conveyor 17 and rollers 18 so that they are not damaged in any way. As the slat conveyor 17 is driven at a lower speed than the rollers 18, the slat conveyor tends to hold back the ends of the board while the screws on the rollers push the board over to one side away from the carriage. The board is then carried forward by the rolls at a safe distance from the carriage. The slatted-bed conveyor carries away all short pieces and sawdust and dumps them into the space between the bed conveyor and the first two rollers. Any suitable means may be employed for disposing of such material as, for example, a conveyor to carry the fragments to a machine where they may be ground into fuel for the boiler-room. The shield or guard 30 serves to keep the bark, sawdust, and other fragments from being thrown on to the floor and also serves to keep short slabs or boards from traveling crosswise on the rollers. The conveyor mechanism, in addition to carrying away all the wood fragments, prevents injury to the sawyer and other workmen by enabling the carriage to be reciprocated without striking boards or slabs traveling on the conveyor.

In the operation of the saw-guide, when the member 13 has moved the log, or the remaining portion of the log, to the position shown in dotted lines in Fig. 3, the head 15 on the standard 14 engages the roller 42 on lever 40 and closes the switch 39. The closing of the circuit by the switch 39 starts motor 38 into operation and raises the member 34 and the saw-guide 31 carried thereby. The sawyer can then operate switch 43 to lower the guide 31 to the desired position along the band saw. To prevent injury to the apparatus, the limit switches 44 are engaged by the finger 45 to break the circuit at the upper and lower limits of travel of the saw-guide.

While, in the illustration given, I have set forth specific and detailed construction, it will be understood that wide changes in construction may be made without departing from the spirit of my invention. The foregoing detailed description has been given for clearness of understanding only, and no unnecessary limitations should be understood therefrom, but the appended claims should be construed as broadly as permissible, in view of the prior art.

I claim:

1. In combination with a frame and a vertically supported driven saw therein, a saw-guide arm equipped with a groove receiving a portion of said saw, means for raising and lowering the saw-guide, work-traversing and feeding mechanism, and cooperating means on said mechanism and said frame for actuating said first-mentioned means to raise said saw-guide arm.

2. In combination with a frame, wheels mounted therein, a vertical band saw carried by said wheels, a saw-guide slidably supported by said frame and engaging said band saw, means for raising and lowering the saw-guide, a log carriage, work-supporting means carried by said carriage for advancing the log toward the saw, and cooperating means on said work-supporting means and said frame for actuating said first-mentioned means to raise said saw-guide.

3. In combination with a frame, wheels mounted therein, a vertical band saw carried by said wheels, a saw-guide slidably supported by said frame and engaging said band saw, means for raising and lowering the saw-guide, a log carriage, work-supporting means carried by said carriage for advancing the log toward the saw, cooperating means on said work-supporting means and said frame for actuating said first-mentioned means to raise said saw-guide, and manually-controlled means for lowering said saw-guide.

4. In combination with a frame and superposed wheels mounted therein, a band saw mounted on said wheels, a saw-guide adjustably supported by said frame and engaging said band saw, motor driven means for raising and lowering said saw-guide, automatic switch mechanism carried by said frame, a log carriage, work-supporting means carried by said carriage for advancing the log toward the saw, means on said frame and said work-supporting means for actuating said automatic switch, and a manually-controlled switch controlling the motor-circuit for lowering said saw-guide.

5. In combination with a frame and a vertically supported driven saw therein, a saw-guide arm slidably engaging said saw, means for raising and lowering the saw-guide, work-traversing and feeding mechanism, cooperating means on said mechanism and said frame for actuating said first mentioned means to raise said saw, and manually-controlled means for actuating said first mentioned means to lower said saw.

6. In combination with a frame and a vertically supported driven saw therein, a saw-guide arm slidably supported by said frame and engaging said saw, an electric motor for raising and lowering the saw-guide, work-traversing and feeding mechanism, and cooperating switch means on said mechanism and said frame for actuating said motor to raise said saw.

7. In combination with a frame, superposed wheels mounted thereon, a band-saw carried by said wheels, a saw-guide slidably supported by said frame and engaging said band-saw, motor driven means for raising and lowering said saw-guide, switch mechanism for actuating said motor to raise said saw-guide, a log carriage, work-supporting means carried by said carriage for advancing the log toward the saw, and means associated with said log-advancing means for closing said switch when the log-advancing means carries the last portion of the log toward the saw.

CHARLES J. PETTIBONE.